United States Patent [19]

Yonaha et al.

[11] Patent Number: 5,299,389
[45] Date of Patent: Apr. 5, 1994

[54] AUTOMATIC GRINDING APPARATUS

[75] Inventors: Seishu Yonaha; Meitoku Chin; Kenichi Yatsuda, all of Tokyo, Japan

[73] Assignee: Aiko Engineering Co., Ltd., Tokyo, Japan

[21] Appl. No.: 956,932

[22] Filed: Oct. 2, 1992

Related U.S. Application Data

[63] Continuation-in-part of Ser. No. 631,421, Dec. 21, 1990, abandoned.

[51] Int. Cl.$^5$ .......................................... B24B 49/00
[52] U.S. Cl. .............................. 51/165 R; 51/165.71; 51/165.77
[58] Field of Search ........... 51/165 R, 165.71, 165.77, 51/165.78, 165.87; 901/15, 16, 28, 29, 41

[56] References Cited

U.S. PATENT DOCUMENTS

| | | | |
|---|---|---|---|
| 4,053,289 | 10/1977 | Tatsumi | 51/165.77 |
| 4,221,514 | 9/1980 | Pavlovsky | 51/101 R |
| 4,523,409 | 6/1985 | Defazio | 51/165.77 |
| 4,828,451 | 5/1989 | Mikoshi et al. | |
| 4,886,529 | 12/1989 | Hasimoto et al. | |
| 5,067,085 | 11/1991 | Wenzel et al. | 51/165.71 |
| 5,077,941 | 1/1992 | Whiting | 51/165.71 |
| 5,119,600 | 6/1992 | Chikatsune et al. | 51/165.71 |

FOREIGN PATENT DOCUMENTS

1-121169 12/1989 Japan .

Primary Examiner—M. Rachuba
Attorney, Agent, or Firm—Jacobson, Price, Holman & Stern

[57] ABSTRACT

An automatic grinding apparatus includes a constant rotating grinder (24) having a motor (25) in which a load current increases or decreases due to the metal removal rate per unit hour, a travelling device for moving the grinder three-dimensionally along the grinding surface, a sliding device (20) for adjusting the distance between the grinder and an object (50, 51) to be found and a controller for controlling the sliding device to allow the load current of the grinding motor to be constant. An articulated robot or a cartesian coordinate robot is used for the travelling device. The automatic grinding apparatus starts the grinding motor at first, halting the travelling device at the initiation of grinding, permitting the grinder to approach the object to be ground after a time interval and starting the travelling device simultaneously or a little later after detecting that the grinding disk (26) contacts the object to be ground, due to the variation of the load current of the grinding motor. The apparatus restores respective relative positions of the grinder and the sliding device (20) to a certain position by regulating the operation time of an elevation motor (21) of the sliding device or by directly detecting the location of the slider of the sliding device before and after the grinding process. The automatic grinding apparatus is used for grinding a workpiece (50) such as for finishing welded metal and deburring or chamfering the work piece.

5 Claims, 7 Drawing Sheets

AUTOMATIC GRINDING APPARATUS

This is a continuation-in-part of U.S. patent application Ser. No. 07/631,421, filed Dec. 21, 1990 which was abandoned upon the filing hereof.

BACKGROUND OF THE INVENTION

This invention relates to an automatic grinding apparatus used for finishing a welded excess metal deburring or chamferring a work piece.

An automatic grinding apparatus for finishing the welded excess metal, deburring or chamferring the work piece is known from Japanese Patent Application Laid Opened No. Hei 1-121169, for example, such as the apparatus comprising an electronic grinder of which a motor load current decreases or increases due to the metal removal quantity per unit hour, a slider supporting the grinder, a sliding device elevating the slider, a travelling truck and rails. Said travelling truck runs parallel to a grinding line (of the excess metal of or its reinforcement of weld) on the rails at a constant speed. In said apparatus, a pinion is projected from the bottom of the travelling truck to engage a rack provided on the guide rails. A travelling motor which is contained in the travelling device rotates the pinion through a speed reduction device to run the truck toward a longitudinal direction of rails at a constant speed. The sliding device controls the distance in a perpendicular direction between the electronic grinder and the excess metal of the welding, in which a supporting block contained in the slider is threaded to engage an output shaft of the slide elevation motor which on the upper end of the device to elevate the slider by a rotation of the elevation motor. The electronic grinder is attached by a holder provided at the front portion of the slider.

Figure 8:
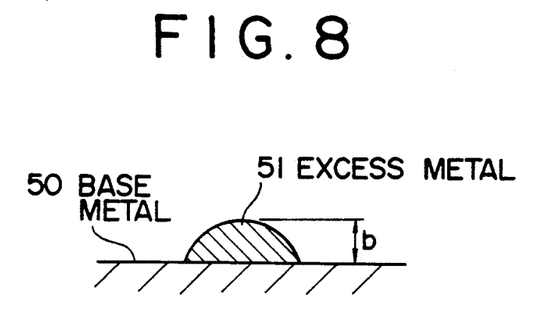
FIG. 8 is a cross section view of the welded excess metal to be ground in accordance with the present invention.
Figure 9:
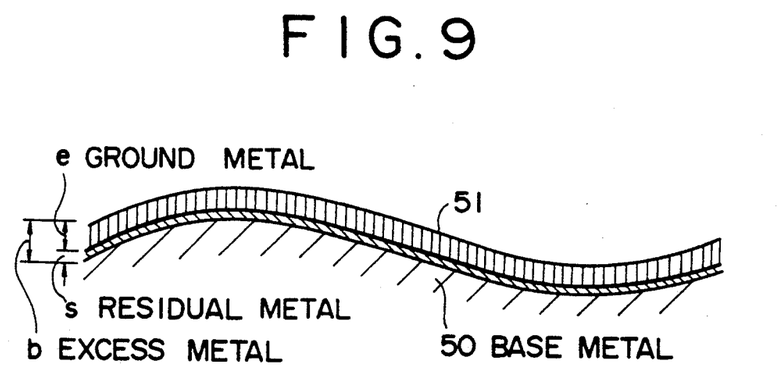
FIG. 9 is a vertical section view of the welded excess metal to be ground in accordance with the present invention.

When the truck travels at a constant speed along the grinding line (of the excess metal of the welding), the slide device is so controlled that the motor load current of the grinder is constant. As a result, the metal removal rate in 3 mm/min is always kept constant even if the grinding disk is worn. Therefore, in the case that the excess metal having a cross section as shown in FIG. 8, substantially equally exists on the welding line as shown in FIG. 9, even if a base metal surface is deformed, the equally finishing over such deformed surface is performed. Further since the apparatus is had no effect of a gravity as required in a system for controlling the grinding pressure, there is an advantage that the controlling capacity is stable for any type of grinding attitudes such as facing towards the horizontal direction or overhead direction.

While in actuating the above described apparatus at the grinding initiation, it is required to start the rotation of the grinding motor in a condition that the grinding disk does not contact the object to be ground and thereafter either of three operating system described hereinbelow will follow:

(A) To start both of the slide controlling circuits (not shown) and the travelling truck simultaneously.

(B) To start only the slide controlling circuit at first and then the travelling switch is operated at the time of the grinding process being started after the sliding device is automatically lowered due to the low grinding motor load current.

(C) To lower the sliding device by switch operation, then the start both of the sliding controlling circuit and the travelling truck at the time of the grinding process being started.

In the above described system, (A) is automatically actuated by an external command, however the unground portion remains near around the grinding initiation. (B) and (C) are utility systems in which there remains no unground portions, however the switch control requires a monitor by a person.

In the above described travelling truck system, since the actuation of the system at the grinding initiation has originally depended on the person, it is not a great problem that the monitoring is required. While for grinding a plurality of portions of the welding excess metal is by a program control in which a robot is used for the travelling device, since the system is also automatically actuated at each grinding initiation by an actuation signal, the residual phenomenon of the unground portion is inevitable in a conventional system. In case of grinding the wholepart of welding excess metal to the extent of grinding to the ridgeline thereof, it is also inevitable that the grinding disk comes into collision with the object to be ground when the robot reaches to the next grinding initiation, since the sliding device falls down at said ridgeline by a slide control faculty.

In addition, when the robot reaches the next grinding initiation after the new grinding disk is exchanged since the sliding device has been automatically lowered due to the exhaustion of the grinding disk, it is also inevitable that the new grinding disk comes into collision with the object to be ground. Further when the grinding motor is stopped during grinding condition to finish the grinding process, the rinding disk intrudes into the object to be ground due to an inertia rotation of the motor, and the base metal surface is subject to be damaged.

The object of the present invention is to provide an automatic grinding apparatus improved in preventing the grinding disk to come into collision with, or to intrude into the object to be ground, or to damage the base metal surface in case that a robot is used as the travelling device for a constant rotating grinder.

SUMMARY OF THE INVENTION

To achieve the above described object, the invention provides an articulated type or a cartesian coordinate type industrial robot composed to be a travelling device on which a constant rotating grinder and a sliding device are loaded.

As taught by U.S. Pat. No. 3,896,360, the forward feed speed is so controlled that the rotation torque reaches a programmed level in moving the tool along the programmed contour of the workpiece, making it possible to ignore the wearing of the tool, so that the programmed contour could be processed effectively. However, in a grinding process by the grinding disk, the wearing of the disk necessarily occurs and the finishing process is not achieved merely by the movement of the rotating axis of the disk along the programmed contour. Therefore, in the present invention, a sliding device is attached to the travelling device (a robot wrist) which moves along a three-dimensional programmed contour and the sliding device actuates the grinder to approach to or to be apart from the work piece to keep the electric current of the grinding motor constant, thereby the wearing of the grinding disk is compensated and the metal removal rate is kept constant.

Being based on the technique described hereinbefore, the automatic grinding apparatus of the present invention comprises:
- a constant rotating grinder including a grinding motor and a grinding disk actuated by the motor, the motor having almost no rotation variation, i.e. variation in RPM, due to the variation of load on the grinding disk and the load current of the motor increases or decreases due to the metal removal rate;
- an industrial robot;
- a robot controller;
- a travelling device attached to a wrist of the industrial robot for three-dimensionally travelling the constant rotating grinder along the grinding surface of the work piece to be ground;
- a sliding device having an elevation motor for adjusting a distance between the grinding disk and the grinding surface of the workpiece to be ground and a slider actuated by the elevation motor and supporting the constant rotating grinder at the front surface thereof and the sliding device being capable of independently actuating the travelling device;
- a programmable controller for controlling the grinder and sliding device by receiving respective signals such as starting, halting the control thereof, returning to the home position and stopping from the robot controller;
- timer means generating a signal for actuating the sliding device to have the grinding disk approach the grinding surface after the slip current of the grinding motor becomes stable at the grinding initiation;
- a detecting means outputting the driving signal to the travelling device simultaneously with or having a time lag after detecting that the disk contacts the metal surface to be ground due to the variation of the load current of the grinding motor; and
- means for recovering the relative location of the disk and the sliding device to be in the home position by regulating an actuating time of the elevation motor before and after the grinding process.

In the apparatus, it is possible for the recovering means to recover the relative location of the disk and the sliding device to be kept at the home position by directly detecting the variation of the slider position from its basic position before and after the grinding process.

The automatic grinding apparatus of the present invention further comprises means for halting a control faculty of the sliding device at an optional time during the grinding process to keep the relative positions of the grinder and the sliding device in a state at that time and means for stopping a rotation of the grinding motor thus actuating the sliding device to a direction where the grinder is kept apart from the object to be ground at the end point of the grinding process.

In the automatic grinding apparatus of the present invention, an irregularity is removed by a smoothing circuit after the load current of the constant rotating grinder is detected and converted to direct current by a rectifier circuit.

The output of said smoothing circuit is compared with a set current level by a comparator and the elevation motor is actuated to elevate the grinder to approach to or to be apart from the work piece respectively due to the variation of the substantial load current which is smaller or bigger than the set current level. Since the load current of the electronic grinder is kept constant, a certain quantity of the excess metal can be ground to remove so far as the travelling speed of the grinder is constant. Therefore in a case that the height and the width through whole length of the welding seam is equal as the automatically welded bead, even if the base metal surface is modified along the welding seam, the excess metal of the welding can be automatically ground to remove along the base metal surface.

It is possible to control the load current of the grinder to be kept constant by the industrial robot. However, since the weight of the robot body is large and the robot has a lack of rigidity at the articulated portion thereof, the wrist portion thereof is necessarily late for following up thereafter. In comparison therewith, in the present invention, while the robot is utilized as the travelling device, the sliding device is attached to the write portion of the robot and a light grinder is controlled at one axis of the sliding direction, so that a following up capacity of the grinding disk is improved.

BRIEF DESCRIPTION OF THE DRAWINGS

These and other objects and many of the attendant advantages of this invention will be readily appreciated as the same becomes better understood by reference to the following detailed description when considered in connection with the accompanying drawing wherein.

DETAILED DESCRIPTION OF THE PREFERRED EMBODIMENTS

Figure 1:
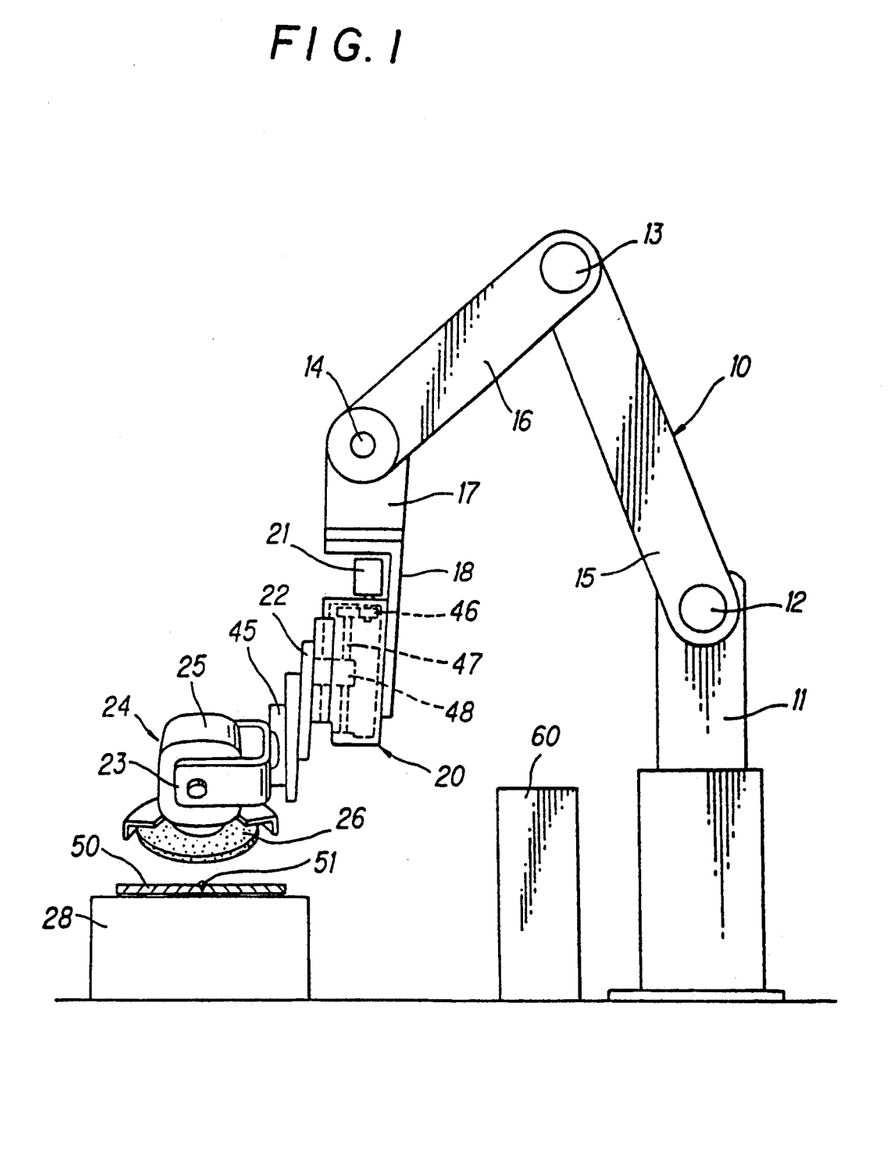
FIG. 1 is a front view of an automatic grinding apparatus made in accordance with the present invention.
Figure 2:
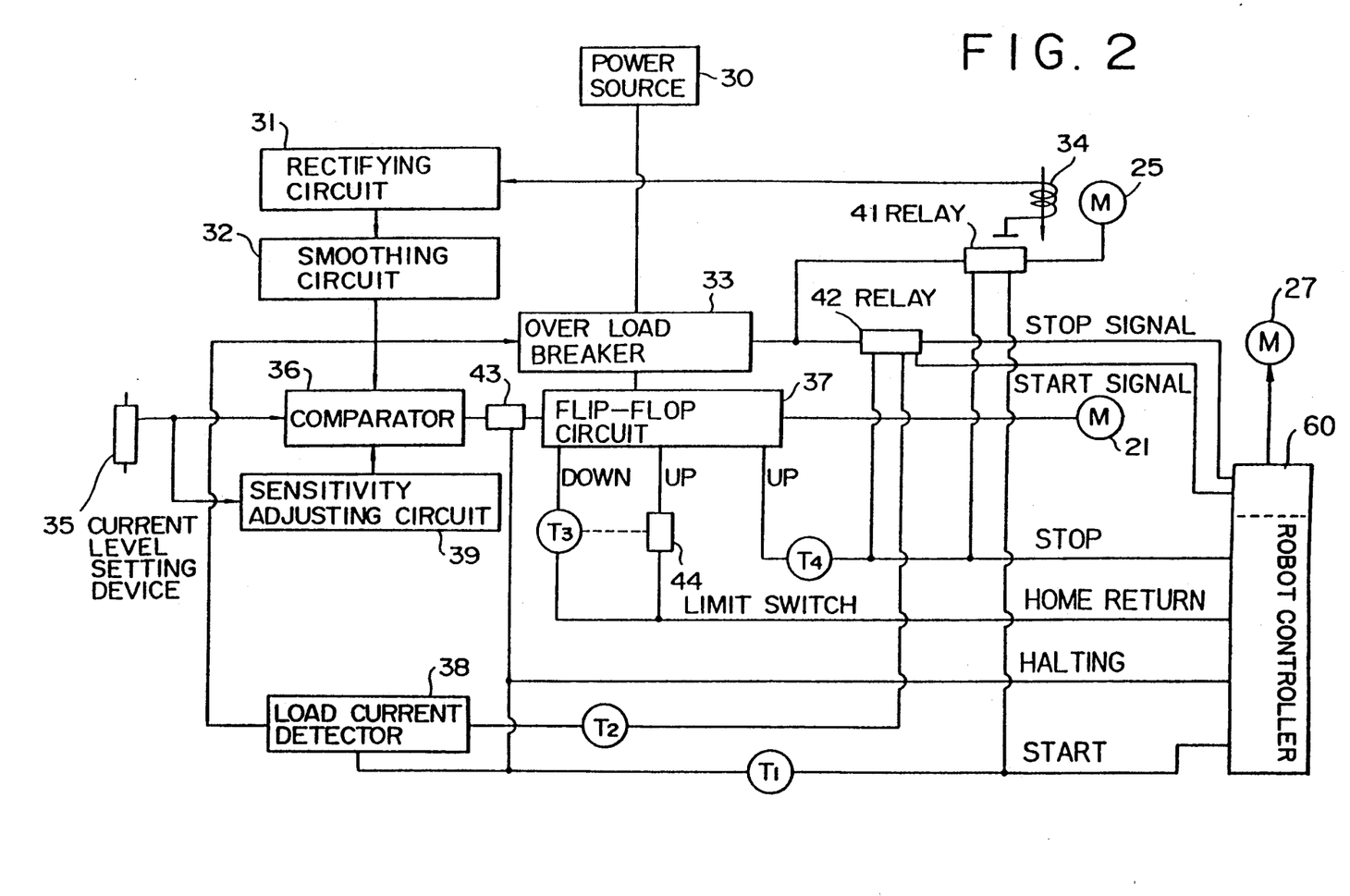
FIG. 2 is a diagram view of the control circuit of the apparatus made in accordance with the present invention.

FIG. 1 is a front view of the apparatus made in accordance with the present invention in which the articulated type industrial robot is utilized as the travelling device and FIG. 2 is a diagram view of the control device of the apparatus.

An articulated type robot 10 is used for actuating an end arm 17 in three-dimensional movement through several joints 12, 13, 14 and arms 15, 16 provided at the upper portion of a column 11. As shown in FIG. 1, a sliding device 20 is secured to the end arm 17 and a turning plate 45 is provided at a slider 22 for attaching a constant rotating grinder 24, the plate 45 providing a wrist type structure grinder 24 comprises a motor 25 and a grinding disk 26

As later described with reference to FIG. 8, the sliding device 20 includes the elevation motor 21 provided at the upper portion thereof, a screw 47 engaging the motor output shaft through a reduction gear 46 and a supporting block 48. The supporting block 48 is engaged with screw 47 and has a slider 22 at the front portion thereof. The abrasive disk 26 is disposed at the direct upper portion of a welded excess metal 51 of a work 50 set on a frame 28 and is approached by a predetermined program to grind the excess metal.

Referring now to FIG. 2, there is shown a block diagram of control circuit according to the present invention in which the alternating current reversible motor is used for elevation motor 21.

All of the motor 25, the travelling motor 27 and the elevation motor 21 of the grinder 24 are actuated through an overload breaker 33 by a power source 30(100v alternating current, for example). A plurality of travelling motors 27 rotate to allow a seam speed of the grinder travelling three-dimensionally to be optionally constant by a controller 60 for the robot. As described above, in spite of the metal removal quantity per an unit hour, the motor 25 of the grinder 24 keeps it rotation frequency by the electronic control device (not shown). At that time, variable load current of the motor 25 is detected at a current detector 34 and indicated by a load current indication scale through a rectification circuit 31 and a smoothing circuit 32 and transferred to a comparator 36. The comparator 36 compares said load current with the current value which is preliminarily set at a current value setting device 35, when an absolute value of the difference resulting from said comparison exceeds the value predetermined by a sensitivity adjusting circuit 39 and said comparator actuates a reciprocal changing device 37 to allow the motor 21 for elevating to rotate normally or reversely according to a positive or a negative difference.

When the load current of the motor 25 of the electronic grinder exceeds a limit value of a tolerance, the overload breaker 33 is actuated to cut of the power source 30 and rotation of each of the motor 25, the travelling motor 27 and the elevation motor 21 of the grinder 24 is stopped to prediminarily prevent the burning of the grinder and the damage of the grinding disk.

Other than elements described above, the following elements are shown in FIG. 2, that is, terminals receiving each signal from the programmable controller 60 such as actuating, halting the control, recovering to the initial point and stopping, a load current detector 38. timers $T_1$ to $T_4$, relays 41 to 43 and a limit switch 44 and will be described hereinafter.

The signal actuates the relay 41 to start the rotation of the grinding motor 25 and the relay 43 is late to be operated in proportion to the timer $T_1$ to fall the slide 22 by the elevation motor 21 for elevating the slide. At this time, the load detecting circuit 38 disregards the smoothed load current of the grinder motor 25 and from the moment of said load current exceeding a certain value, the relay 42 is late to be turned off in proportion to the timer $T_2$ to start the travelling motor 27.

Figure 6:
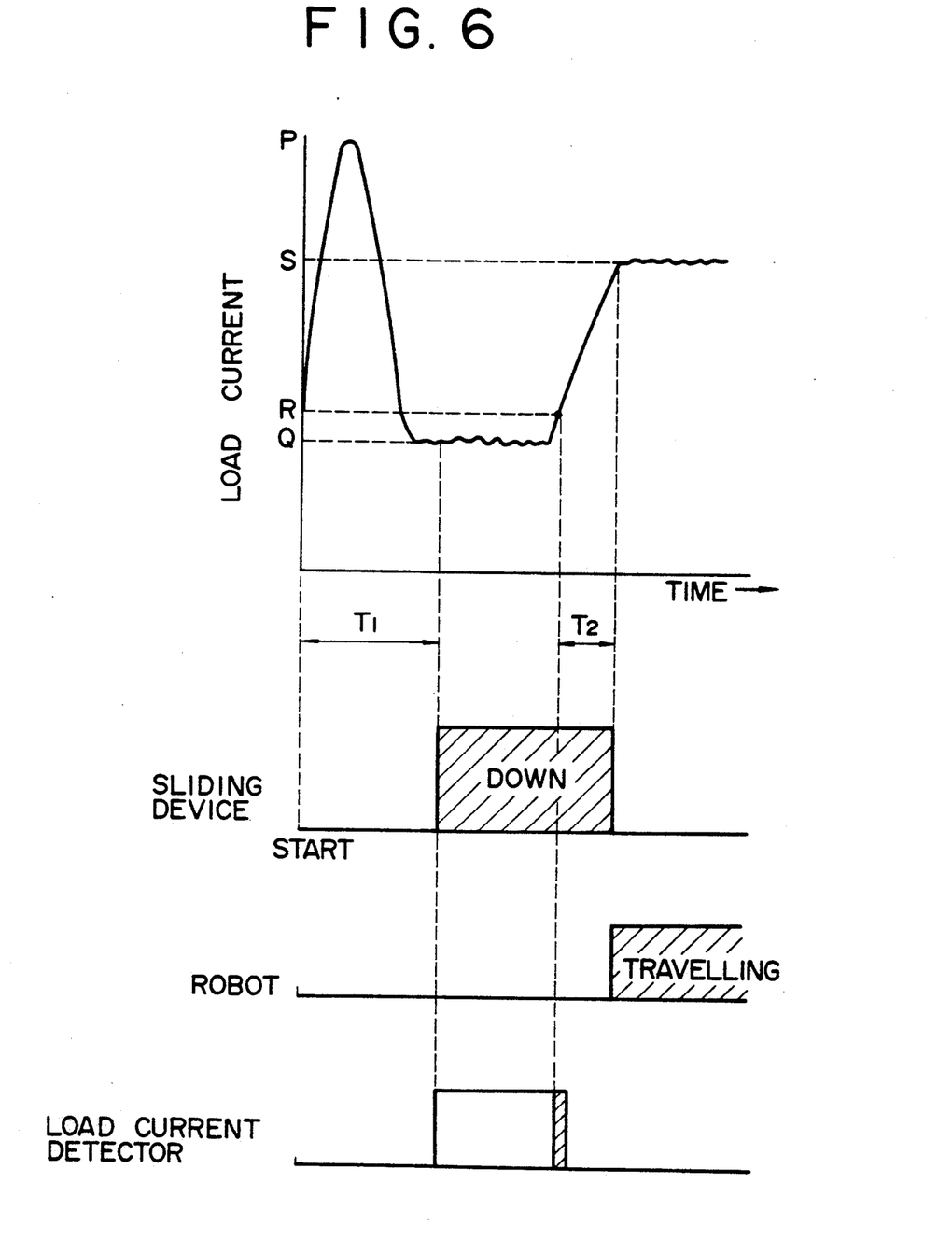
FIG. 6 is an operation time chart at time of actuating the apparatus made in accordance with the present invention.

Above starting operation is shown in FIG. 6 in respect of the load current of the grinding motor. The load current of the grinding motor 25 rapidly rises to P after the starting and goes down to Q when the rotation of the motor becomes a nominal speed to be stabilized. When the slide moves down after the timer $T_1$, simultaneously the load detecting circuit 38 starts the monitoring. Since the load current rises again when the grinding disk contacts the object to be ground, from the moment of the current exceeding the threshold value R, the load detecting circuit is late to start the travelling motor 27 in proportion to the timer $T_2$. In respect of the above, $T_1$ is substantially constant (about 2 seconds is normal), while $T_2$ varies due to the load set value S. That is, to prevent the unground portion to remain, $T_2$ is set large when the value S is large and to prevent the excess grinding, $T_2$ is set to be small when the value S is small.

Figure 3:
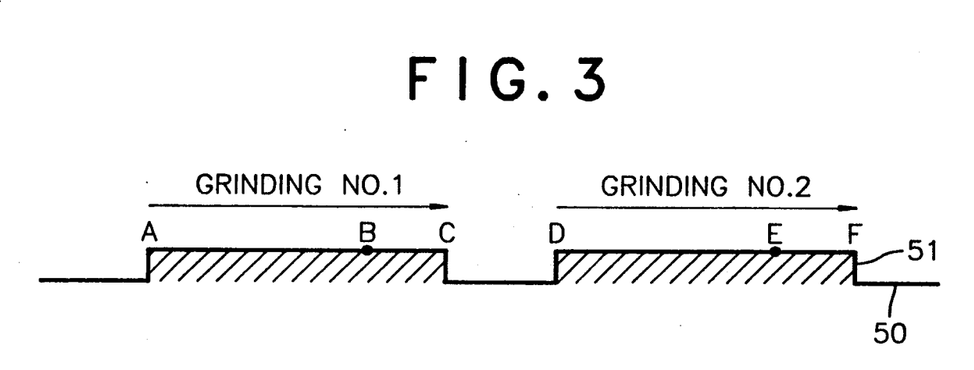
FIG. 3 is a vertical section view of a plurality of portions of the excess metal to be ground in accordance with the present invention.

Since the relay 43 is turned off when signal of halting the control is input, respective relative positions of the sliding device and the grinder are fixed as it is. For example, as shown in FIG. 3, in case of grinding entirely toward the ridgeline C of the object, by halting the sliding control at one time at B before C, there is no fear of the grinding disk coming into collision with the object to be ground at the next process initiation point D due to the excess lowering of the sliding device at C and the damage of the grinding disk between B and C is prevented. Further, when the robot moves from C to D, since the faculty of controlling the slide is halted at B point, the sliding motor can be moved thus rotating while it prevents the slide moving down. If said faculty of controlling the slide is not halted one time, the sliding device will entirely move down to the lower limit in moving. Simultaneously when the robot reaches at the D point, the signal for halting the control is released and the relay 43 is operated, to recover the slide control faculty, then the grinder moves down to enable starting the grinding process immediately.

Figure 4:
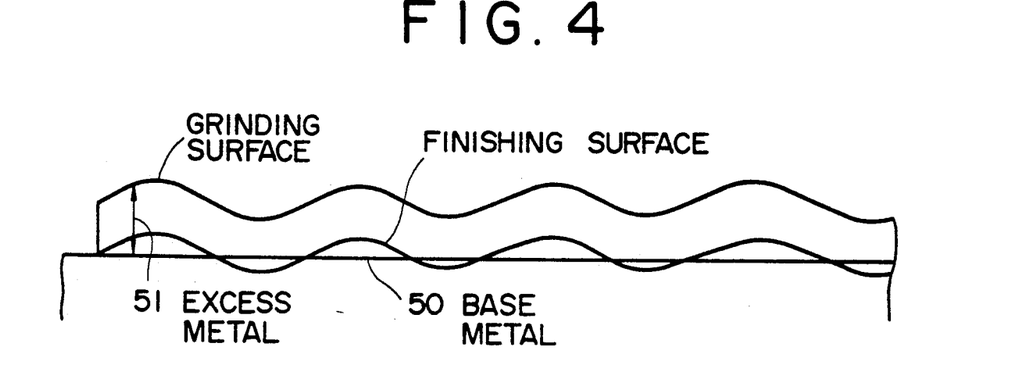
FIGS. 4 and 5 are enlarged vertical section views of the welded excess metal having the irregularity along the seam to be ground.
Figure 5:
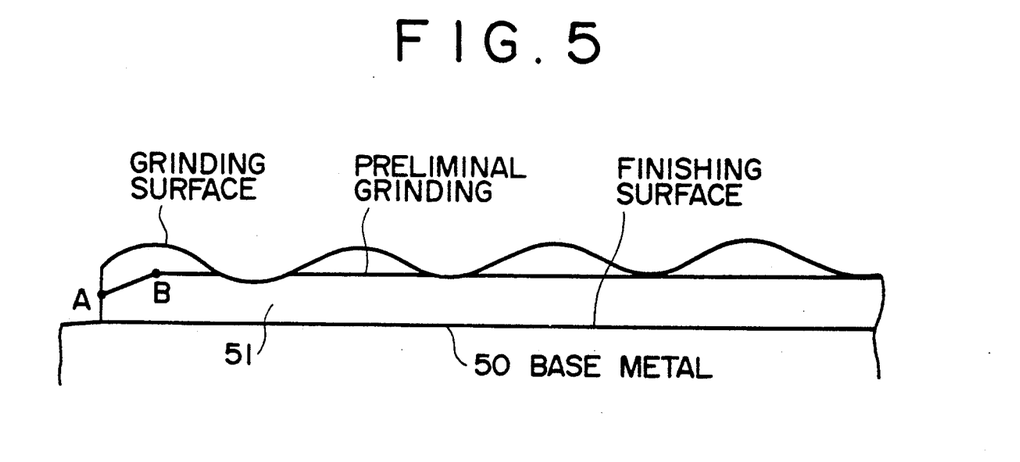

It is also possible of corresponding to the irregularity on the surface of the object to be ground by halting or recovering the faculty of controlling the slide. For example, as shown in FIG. 4, in case of grinding the irregular excess metal by controlling the slide, the irregularity also remains on the finishing surface in which the excess metal 51 still remains and an intrusion into the base metal surface 50 occurs. In the above case, as shown in FIG. 5, the preliminary grinding is started from the point A after the load setting value is made small, the slide control is halted at the point B where the slide controlling facilitates, then the projecting portion of the excess metal is removed first. Since the load setting level is small, the consumption of the grinding disk by said preliminary grinding is less. Then the main grinding by controlling the slide is continued to perform the plane final finished surface.

The operation by the signal for recovering to the home position will be described hereinafter. When the signal for recovering to the home position is input, the reciprocal changing device 37 normally rotates the slide elevation motor 21 to raise the slide device and said slide device stops after reaching the upper limit switch 44, then momentaly said reciprocal changing device 37 rotates the slide elevation motor 21 reversely to lower the slide device and the slide device stops by the timer $T_3$. In case of the rotation speed of the motor 21 in respect of the timer $T_3$ is set constant, by above described operation, respective relative locations of the slide device and the grinder are surely recovered to a constant state. By utilizing above faculty in case of starting the grinding process in which the height toward the grinding disk is unknown or in case of starting again after the grinding disk has been replaced, the robot is always programmed in the condition that the grinder returns to the home position. The grinding timer T₃ is so set that the rather upper central portion of stroke of the slide device is to be the home position.

Other than the above described example, as means for recovering the grinder to the home position, it is possible that the location of the slider 22 of the sliding device is directly detected by a potentiometer and a distance from the upper or lower limit of the basic position is rendered to be constant by actuating the elevation motor. When the signal of stopping the control is input, the relays 41 and 42 are cut to stop both of the travelling motor 27 and the grinding motor 25, simultaneously the slide device is raised by rotating the motor 21 normally for elevating the slide and the slide is stopped by a timer T₄. By the above operation, since the grinding disk is rendered to stop its rotation thus being apart from the object to be ground, there is no fear to damage the base metal surface. Further the slide rising prevents the grinding disk to come into collision with the object to be ground at the next grinding process initiation.

FIG. 2 shows a block diagram of the actuation of the control circuit. For the practical control device, a programmable controller (not shown) is connected to each element to control each single actuation sequence.

Figure 7:
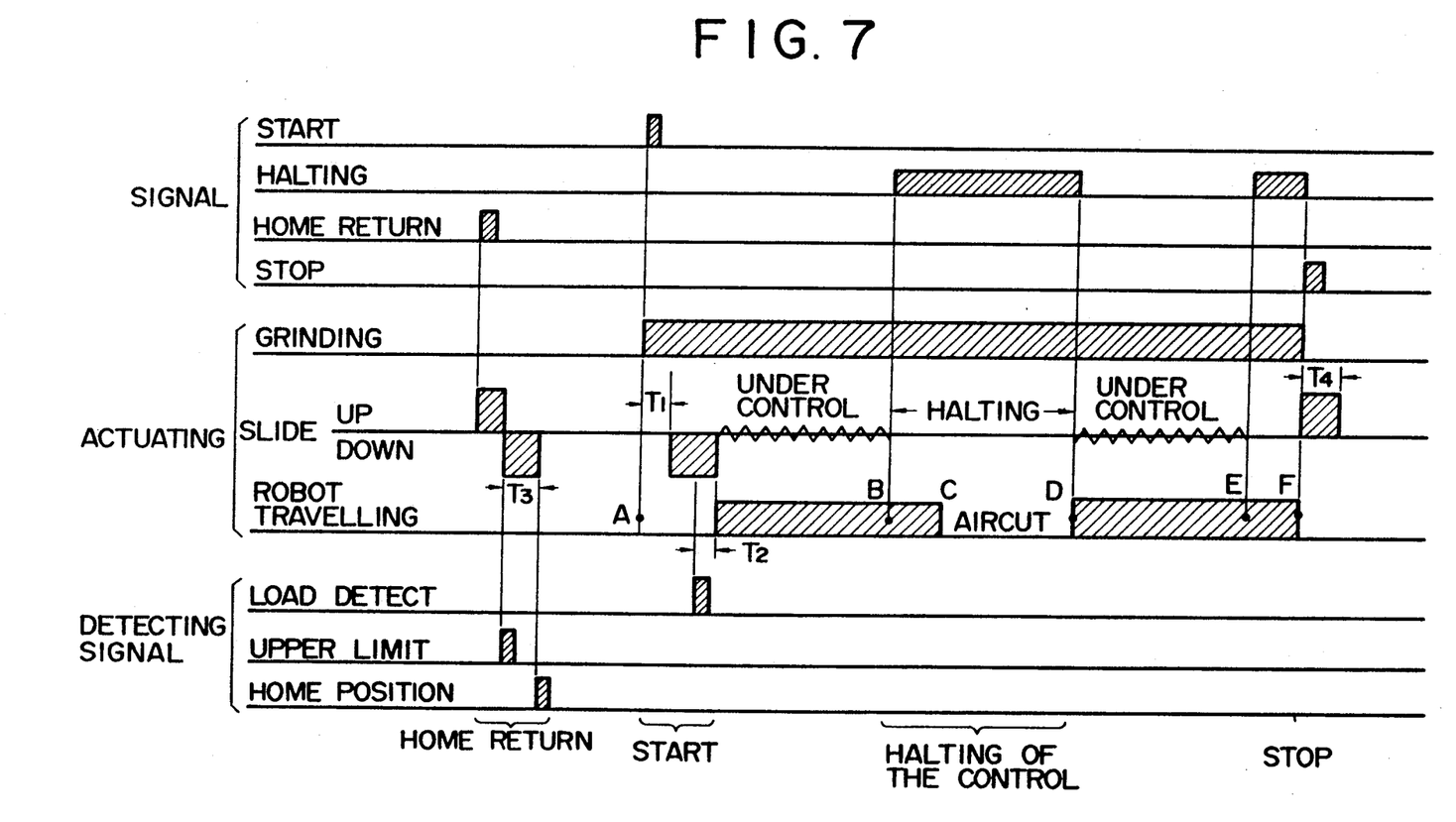
FIG. 7 is a time chart showing each operation of the apparatus made in accordance with the present invention such as the recovery to the initial point, the starting, the controlling, the halting of the controlling and the stopping.

FIG. 7 shows a time chart of the operation comprising the recovering to the home position, the starting, the controlling, and the halting of the control (the air immigration or the air cutting for the grinding disk) in case of grinding the object of which the base metal surface is separated into two parts as shown in FIG. 3.

In accordance with the present invention, in case of using a robot for a travelling device, it is possible to automatically grind a plurality of portions by a programming operation. That is, since the robot runs by detecting that the grinding is started, the predetermined grinding is possible even if the position of the object to be ground dislocates from the position which the robot has been programmed. It is also possible to grind the irregular or modified base metal surface smoothly and the grinder safely moves to the next process point thus rotating after entirely grinding to the extent of the ridgeline of the object. Further the apparatus made in accordance with the present invention has an effect not to damage the base metal surface such as an intrusion even if the grinding process is halted at any position of the metal surface to be ground.

We claim:

1. An automatic grinding apparatus comprising:
   a constant rotating grinder comprising a grinding motor and a grinding disk actuated by said grinding motor, said grinding motor having substantially no variation in RPM due to variation of load on said grinding disk, and a load current of said motor which increases or decreases due to metal removal rate;
   an industrial robot having a wrist means thereon;
   a robot controller;
   a travelling device attached to said wrist means of said industrial robot and supporting said grinder for three-dimensional movement of said constant rotating grinder along a surface of a workpiece to be ground;
   a sliding device on said robot comprising an elevation motor for adjusting the distance between said grinding disk and said surface of the work piece to be ground and a slider actuated by said elevation motor and supporting said constant rotating grinder at the front surface thereof for raising and lowering said grinder, said sliding device being capable of independently actuating said travelling device;
   a programmable controller for controlling said grinder and sliding device to start and stop the control thereof, to recover to the initial start point, and to stop by receiving respective signals from said robot controller;
   timer means for generating a signal for actuating said sliding device to move said grinding disk towards the workpiece after slip current of said grinding motor becomes stable at initiation of grinding;
   detecting means outputting a driving signal to said travelling device simultaneously with or after a time delay after detecting that said disk contacts said surface to be ground due to the variation of the load current of said grinding motor; and
   means for recovering the relative location of said disk and said sliding device to a certain condition by regulating an actuating time of said elevation motor before and after the grinding.

2. An automatic grinding apparatus as claimed in claim 1 wherein:
   said recovering means comprises means for controlling the relative location of said disk and said sliding device to a certain condition by directly detecting the variation of the slider position from its basic position before and after the grinding process.

3. An automatic grinding apparatus as claimed in claim 1 and further comprising:
   means for halting a control faculty of the sliding device at an optional time during grinding to keep relative positions of the grinder and the sliding device as they are.

4. An automatic grinding apparatus as claimed in claim 1 and further comprising:
   means for stopping rotation of the grinding motor and actuating the sliding device in a direction away from the workpiece to be ground at the end of grinding.

5. An automatic grinding apparatus as claimed in claim 1 wherein:
   said travelling device comprises a robot of an articulated type or a cartesian coordinate type robot.

* * * * *